United States Patent Office 3,409,688
Patented Nov. 5, 1968

3,409,688
DEHYDROGENATION OF HYDROCARBONS WITH AN ARGON-TREATED IRON OXIDE-CONTAINING CATALYST
Bingham Y. K. Pan, Texas City, Tex., assignor to Monsanto Company, St. Louis, Mo., a corporation of Delaware
No Drawing. Filed Mar. 21, 1966, Ser. No. 535,710
10 Claims. (Cl. 260—669)

ABSTRACT OF THE DISCLOSURE

Process for the dehydrogenation of hydrocarbons in the vapor phase in the presence of a diluent at elevated temperatures with an alkali-metal-promoted iron oxide catalyst pretreated with argon at a temperature of at least 400° C. for a period of at least 10 hours.

---

This invention relates to the dehydrogenation of hydrocarbons. More particularly, the present invention relates to an improved process for the catalytic dehydrogenation of hydrocarbons and to an improved modified iron oxide catalyst therefor.

For several years, selective catalytic dehydrogenation has been of great importance in changing hydrocarbons from one form to other forms more useful in the various chemical process and manufacturing industries. Two of the more important of the catalytic dehydrogenation reactions are the dehydrogenation of olefins to diolefins, e.g., n-butenes to butadiene, and the dehydrogenation of alkyl aromatics to unsaturated alkyl aromatics, e.g., ethylbenzene to styrene.

Among the catalysts useful in these dehydrogenation reactions are the alkali metal-promoted iron oxide catalysts wherein an alkali metal compound is employed as a promoter. Usually the promoter is a potassium compound. While such catalysts are widely used in the production of butadiene from n-butenes and styrene from ethylbenzene, they suffer the disadvantage of catalyzing the reaction in a manner such that the mole percent selectivity of reaction (moles of desired product per moles of total products) varies inversely with the rate of conversion (weight of desired product per weight of reactant) thus necessitating running the process at fairly low rates of conversion (from 35% to 50%) in order to obtain an economically feasible amount of desired product from the feed. Since the practicality of a given dehydrogenation process often depends on a relatively narrow margin of production, any change in the catalyst which will result in an increase in the selectivity of reaction at various conversion rates is greatly to be desired.

It is an object of the present invention to provide an improved catalyst for the dehydrogenation of hydrocarbons. It is also an object of the present invention to provide a method for the production of an improved dehydrogenation catalyst. A further object of the present invention is to provide an improved process for the dehydrogenation of hydrocarbons. Additional objects will become apparent from the following description of the invention herein disclosed.

The present invention, in one of its embodiments, is a catalyst particularly useful for the dehydrogenation of hydrocarbons, the catalyst comprising a catalyst composition which comprises an alkali metal-promoted iron oxide catalyst which has been treated with argon at a temperature of at least 400° C. for a period of at least 10 hours. In another embodiment, the present invention is a process for the dehydrogenation of hydrocarbons which comprises contacting said hydrocarbons in the vapor phase and in the presence of a diluent and at elevated temperatures with a catalyst comprising an alkali metal-promoted iron oxide catalyst which has been treated with argon at a temperature of at least 400° C. for a period of at least 10 hours.

The catalyst of the present invention is one containing iron oxide as the major active dehydrogenation promoting constituent. A convenient source of iron oxide is in the form of commercial pigments which are of uniform purity and size. However, iron oxide may be obtained by the conventional means of thermal decomposition or oxidation of iron compounds such as ferric nitrate, ferric oxylate, ferric sulphate and the like. In the catalyst of the present invention, generally, the iron oxide is present in an amount of at least 35% by weight of the total catalyst composition and preferably from 45% to about 95% by weight.

The foregoing proportions are given with the amount of iron oxide computed as $Fe_2O_3$ for convenience. However, there are indications that under the conditions of reaction the $Fe_2O_3$ is reduced to an oxide closer to the formula of magnetite, i.e., $Fe_3O_4$. In any case, either of these forms of oxide or one having a degree of oxidation in the aggregate intermediate the two may be used in the preparation of the catalysts.

It is essential that the iron oxide catalysts of the present invention include a promoter which contains an alkali metal compound. This alkali metal compound-containing promoter may comprise, among others, a single alkali metal compound, such as potassium carbonate, a mixture of alkali metal compounds or a mixture of an alkali metal compound with an alkaline earth metal compound. The alkali metal compound-containing promoter is generally used in amounts of at least 1% by weight and preferably from about 3% to about 50% by weight of the total catalyst composition. When a mixture of an alkali metal compound and an alkaline earth metal compound is used, the weight ratio of the alkaline earth metal compound to the alkali metal compound should be in the range from about 1:1 to 5:1, preferably 1:1 to 2:1. The alkali metals most often include sodium, potassium, and lithium and the alkaline earth metals include barium, magnesium and calcium. Some compounds which are illustrative of those which may be used in the preparation of the alkali metal compound-containing promoter of the present invention include the oxides, hydroxides, carbonates, bicarbonates, nitrates, phosphates, borates, acetates of the metals recited with the oxides and carbonates being preferred. The preferred promoters are compounds of potassium, preferably potassium oxide.

Ordinarily, a heavy metal oxide, more difficultly reducible than iron oxide, will be present in the catalyst in an amount from about 0.5% to about 6% by weight of the total catalyst composition in order to stabilize the iron oxide catalyst although this component is not absolutely necessary for an active catalyst. These metal compounds may be incorporated per se in the catalyst or they may be formed therein during the catalyst preparation from primary compounds such as the hydroxides, carbonates and nitrates. Chromium oxide is the preferred stabilizer. The oxides of managanese, bismuth, aluminum, beryllium, tungsten, molybdenum, and cerium are among others which may be used. Diluent materials such as alumina, zirconia, beryllia and asbestos can also be incorporated in the catalyst as can binding agents, silicates, cement, kaolin, and the like which impart structural stability to the catalyst composition.

The most critical feature in the preparation of the catalyst of the present invention is the pretreatment of the catalyst at elevated temperatures in the presence of argon. Usually, the argon treatment of the alkali metal-promoted iron oxide catalyst will be at temperatures of at least 400° C. and over a period of at least ten hours, for example at from 400° C. to 800° C. for a period of 15 to 45 hours. However, it is preferred that the catalyst be treated for at least 20 hours at a temperature of at least 550° C. For optimum results, the dehydrogenation begins immediately after treating the alkali metal-promoted iron oxide catalyst with argon. The argon used should be free of water and other contaminants. The pressure during the argon pretreatment may be at any desired pressure; however, about atmospheric pressure is preferred.

The dehydrogenation of hydrocarbons is carried out in the vapor phase. Usually, temperatures of at least 500° C. and preferably between about 560° C. and 700° C. are used, although temperatures up to about 800° C. and higher can be used. The dehydrogenation may be effected at any desired pressure. However, the partial pressure of the hydrocarbon reactant in the reaction zone is preferably not more than about one atmosphere. The low pressure of the reactant may be obtained by operating under subatmospheric pressure or by the use of a diluent while operating at normal pressure or at superatmospheric pressure. Steam is a particularly good diluent in most cases though other inert diluents might be used. The steam is preferably applied in relatively large amounts, e.g., between one and 30 moles of steam per mole of hydrocarbon feed. Contact time is adjusted by the rate of flow to afford the desired degree of conversion. In general, the contact time of reactant with catalyst corresponds to (measured at standard conditions) between about 50 and 700 grams catalyst per gram mole hydrocarbon per hour.

The following example is given in order to illustrate but not to limit the present invention.

EXAMPLE

An alkali metal-promoted iron oxide dehydrogenation catalyst containing by weight approximately 90% iron oxide, 5% chromium oxide and 5% potassium oxide was placed in a reactor having an inside diameter of approximately 1⅜ inches and a length of approximately 42 inches. The catalyst was in the form of ⅛ inch diameter pellets and gave a catalyst loading of 1363.8 grams. Argon was then flowed over the catalyst at 600° C. for 25 hours at the rate of 0.5 cu. ft./hr. Several runs were then made in the aforementioned reactor for the purpose of dehydrogenating ethylbenzene. In some of these runs, the aforementioned argon-treated catalyst was used and in some runs an untreated catalyst corresponding to the foregoing composition but not pretreated with argon was used. In all of these runs, vaporized ethylbenzene and steam at a weight ratio of steam to ethylbenzene of 2.2:1.0 were introduced into the reactor at about atmospheric pressure. The flow to the reactor was controlled so that contact times corresponding to flows of 50 to 700 grams catalyst per gram mole ethylbenzene per hour were obtained at different locations along the reactor. The selectivity obtained at various conversions was then determined for both the untreated catalyst and the argon-treated catalyst after on-stream times of approximately 600–800 hours and 1600–1700 hours. The figures obtained are shown below in Tables I and II. Table I being the figures obtained after 600–800 hours and Table II containing those obtained after 1600–1700 hours on-stream time.

TABLE I

| Conversion, percent | Selectivity, percent | |
|---|---|---|
| | Untreated catalyst | Treated catalyst |
| 40 | 94 | 95 |
| 45 | 93 | 94 |

TABLE II

| Conversion, percent | Selectivity, percent | |
|---|---|---|
| | Untreated catalyst | Treated catalyst |
| 40 | 93 | 94.7 |
| 45 | 92 | 94 |

In the foregoing tables, the percent conversion obtained is the weight of the styrene produced divided by the weight of ethylbenzene in the feed times 100. Percent selectively is defined as:

$$\text{Selectivity} = \frac{\text{Styrene}}{\text{Styrene} + \text{benzene} + \text{toluene}} \times 100$$

where the values are in moles.

As can be seen from the foregoing example, when styrene conversion is at 40 and 45%, the catalyst with argon treatment gave a styrene selectivity of one to 2% more than catalyst wtihout treatment. It may be also seen that when the catalyst on-stream time was increased from about 800 hours to about 1700 hours, the styrene selectivity of the catalyst with no argon treatment was decreased by 1% but the styrene selectivity of the catalyst with argon treatment remained the same at the 45% conversion level and decreased by only 0.3% at the 40% conversion level. Thus, it can be seen that the argon treated catalyst not only gives higher styrene selectivity but also gives a longer economic catalyst life. It was further found that less catalyst was needed for the same styrene production capacity when the argon-treated catalyst of the present invention was used instead of the corresponding untreated catalyst. The argon-treated catalyst of the present invention was also found to give better performance than that of prior art catalysts treated with ammonia or with mixtures of hydrogen and steam.

The size and shape of the catalyst particles are not critical. For example, the catalyst may be in the form of pellets, powder, pills, saddles, spheres, etc. Symmetrical pellets of from ⅟₅₀ inch to ¾ inch in diameter and ⅟₁₆ inch to one inch in length are considered very satisfactory. Also, reactor size has no bearing on the operation of the invention but it is presumed that the optimum size to give the proper residence time (as is usual in this type of dehydrogenation reaction) is used. Reactor configuration is likewise unimportant. This process can be practiced in a fixed bed reactor having one or more beds, tubular reactor or fluidized bed reactor with equal success.

In addition to its utility in the dehydrogenation of ethylbenzene to styrene, the catalyst of the invention is applicable for dehydrogenation of various other aromatic hydrocarbons having an alkyl side chain of at least two carbons such as, for example, propylbenzene, diethylbenzene, ethyltoluene, propyltoluene, ethylnaphthalene, diethylnaphthalene, diethyl diphenyl, and the like. Likewise, the catalysts of the invention are suitable for use in the production of diolefins by dehydrogenation of mono-olefins having at least four nonquaternary carbon atoms in a straight chain. They are particularly useful, for example, in the production of butadiene from butylene and are also applicable and advantageous for the production of other diolefins and particularly conjugated diolefins such as piperylene, isoprene, the various hexadienes, and the like from the corresponding mono-olefins.

What is claimed is:

1. A process for the dehydrogenation of hydrocarbons which comprises contacting said hydrocarbons in the vapor phase and in the presence of diluent and at elevated temperatures with a catalyst comprising an alkali metal-promoted iron oxide catalyst which has been treated with 0.17 cu. ft. of argon per hr. per lb. of catalyst at a temperature of at least 400° C. for a period of at least 10 hours.

2. The process of claim 1 wherein the diluent is steam, which steam is present in the amount of about 1 to about 30 moles of steam per mole of hydrocarbon, and wherein said elevated temperatures are from about 500 to 800° C.

3. The process of claim 2 wherein ethylbenzene is dehydrogenated to styrene.

4. The process of claim 3 wherein said alkali metal-promoted iron oxide catalyst is promoted by a compound of potassium.

5. The process of claim 3 wherein said alkali metal-promoted iron oxide catalyst has been treated with argon at a temperature of 400° C. to 800° C. for a period of from 15 to 45 hours.

6. The process of claim 3 wherein said alkali metal-promoted iron oxide catalyst comprises from about 45% to about 95% by weight iron oxide and from about 3% to about 50% by weight potassium oxide and from about 0.5% to about 6% by weight chromium oxide.

7. A method for the production of a catalyst which comprises treating an alkali metal-promoted iron oxide catalyst with 0.17 cu. ft. of argon per hr. per lb. of catalyst at a temperature of at least 400° C. for a period of at least ten hours.

8. The method of claim 7 wherein said alkali metal-promoted iron oxide catalyst comprises from about 45% to 95% by weight iron oxide and from about 3% to about 50% by weight potassium oxide and from about 0.5% to about 6% by weight chromium oxide.

9. A catalyst composition which comprises an alkali metal-promoted iron oxide catalyst which has been treated with 0.17 cu. ft. of argon per hr. per lb. of catalyst at a temperature of at least 400° C. for a period of at least 10 hours.

10. The catalyst composition of claim 9 wherein the alkali metal-promoted iron oxide catalyst comprises from about 45% to 95% by weight iron oxide and from about 3% to about 50% by weight potassium oxide and from about 0.5% to about 6% by weight chromium oxide.

References Cited

UNITED STATES PATENTS 2,866,790  12/1958  Pitzer _____ 260—669 XR

DELBERT E. GANTZ, *Primary Examiner.*

C. R. DAVIS, *Assistant Examiner.*